United States Patent [19]

Tretter

[11] Patent Number: 4,873,701
[45] Date of Patent: Oct. 10, 1989

[54] MODEM AND METHOD FOR 8 DIMENSIONAL TRELLIS CODE MODULATION

[75] Inventor: Steven A. Tretter, Silver Spring, Md.

[73] Assignee: Penril Corporation, Rockville, Md.

[21] Appl. No.: 97,448

[22] Filed: Sep. 16, 1987

[51] Int. Cl.$^4$ ............................................. H04B 14/06
[52] U.S. Cl. .................................... 375/27; 375/31; 371/43
[58] Field of Search ........................ 375/25, 26, 27, 37, 375/39, 38; 371/43

[56] References Cited

U.S. PATENT DOCUMENTS

4,597,090 6/1986 Forney, Jr. ............................ 375/39
4,641,327 2/1987 Wei ........................................ 375/38

Primary Examiner—Robert L. Griffin
Assistant Examiner—Marianne Huseman
Attorney, Agent, or Firm—Fleit, Jacobson, Cohn, Price Holman & Stern

[57] ABSTRACT

A modem and method for modulation-demodulation of a received analog signal. The modem receives sixteen bits at four bits per baud. The 8 D Block Encoder encodes nine of the sixteen bits into 12 Z-bits which are used to specify a sequence of four 2 D constellation points. These 2 D constellation points correspond to a sequence of four 2 D subsets of a 8 D subtype selected. The differential encoder differentially encodes two of the sixteen bits to make the code transparent to a 90 degree rotation. The rate $\frac{3}{4}$ convolutional encoder generates a check bit and a bit converter converts the check bit, the differential encoded bits and the remaining five bits into 8 Z-bits. The result is an 8 D trellis with a 20-point 2 D constellation.

13 Claims, 9 Drawing Sheets

FIG. 1

4 x 4 SIGNAL CONSTELLATION

FIG. 2(a) TRANSMITTER

20-POINT 2D SIGNAL CONSTELLATION
FOR 8D CODE

NOTE: POINTS ARE LABELLED BY SUBSET AND
(Z2, Z3, Z4)

FIG. 4
64 - STATE 8D ENCODER

FIG. 5(a)

| CURRENT STATE | NEXT STATE |||||||||
|---|---|---|---|---|---|---|---|---|---|
| | 0 1 2 3 | 4 5 6 7 | 16 17 18 19 | 20 21 22 23 | 32 33 34 35 | 36 37 38 39 | 48 49 50 51 | 52 53 54 55 |
| 0 2 4 6 | 0 1 4 5 | 2 3 6 7 | 4 5 0 1 | 6 7 2 3 | | 1 0 5 4 | 3 2 7 6 | 5 4 1 0 | 7 6 3 2 |
| 8 10 12 14 | 4 5 0 1 | 6 7 2 3 | 0 1 4 5 | 2 3 6 7 | 5 4 1 0 | 7 6 3 2 | 1 0 5 4 | 3 2 7 6 |
| 16 18 20 22 | 2 3 6 7 | 0 1 4 5 | 6 7 2 3 | 4 5 0 1 | 3 2 7 6 | 1 0 5 4 | 7 6 3 2 | 5 4 1 0 |
| 24 26 28 30 | 6 7 2 3 | 4 5 0 1 | 2 3 6 7 | 0 1 4 5 | 7 6 3 2 | 5 4 1 0 | 3 2 7 6 | 1 0 5 4 |
| 32 34 36 38 | 5 4 1 0 | 7 6 3 2 | 1 0 5 4 | 3 2 7 6 | 4 5 0 1 | 6 7 2 3 | 0 1 4 5 | 2 3 6 7 |
| 40 42 44 46 | 1 0 5 4 | 3 2 7 6 | 5 4 1 0 | 7 6 3 2 | 0 1 4 5 | 2 3 6 7 | 4 5 0 1 | 6 7 2 3 |
| 48 50 52 54 | 7 6 3 2 | 5 4 1 0 | 3 2 7 6 | 1 0 5 4 | 6 7 2 3 | 4 5 0 1 | 2 3 6 7 | 0 1 4 5 |
| 56 58 60 62 | 3 2 7 6 | 1 0 5 4 | 7 6 3 2 | 5 4 1 0 | 2 3 6 7 | 0 1 4 5 | 6 7 2 3 | 4 5 0 1 |

\* CURRENT STATE = $W1_n W2_n W3_n W4_n W5_n W6_n$
\* NEXT STATE = $W1_{n+4} W2_{n+4} W3_{n+4} W4_{n+4} W5_{n+4} W6_{n+4}$
\* 8D SUBSET = $Y0_n I1_n I2_n I3_n$

FIG. 5(b)

CURRENT STATE / NEXT STATE

| | 8 9 10 11 | 12 13 14 15 | 24 25 26 27 | 28 29 30 31 | 40 41 42 43 | 44 45 46 47 | 56 57 58 59 | 60 61 62 63 |
|---|---|---|---|---|---|---|---|---|
| 1 3 5 7 | 8 9 12 13 | 10 11 14 15 | 12 13 8 9 | 14 15 10 11 | 9 8 13 12 | 11 10 15 14 | 13 12 9 8 | 15 14 11 10 |
| 9 11 13 15 | 12 13 8 9 | 14 15 10 11 | 8 9 12 13 | 10 11 14 15 | 13 12 9 8 | 15 14 11 10 | 9 8 13 12 | 11 10 15 14 |
| 17 19 21 23 | 10 11 14 15 | 8 9 12 13 | 14 15 10 11 | 12 13 8 9 | 11 10 15 14 | 9 8 13 12 | 15 14 11 10 | 13 12 9 8 |
| 25 27 29 31 | 14 15 10 11 | 12 13 8 9 | 10 11 14 15 | 8 9 12 13 | 15 14 11 10 | 13 12 9 8 | 11 10 15 14 | 9 8 13 12 |
| 33 35 37 39 | 13 12 9 8 | 15 14 11 10 | 9 8 13 12 | 11 10 15 14 | 12 13 8 9 | 14 15 10 11 | 8 9 12 13 | 10 11 14 15 |
| 41 43 45 47 | 9 8 13 12 | 11 10 15 14 | 13 12 9 8 | 15 14 11 10 | 8 9 12 13 | 10 11 14 15 | 12 13 8 9 | 14 15 10 11 |
| 49 51 53 55 | 15 14 11 10 | 13 12 9 8 | 11 10 15 14 | 9 8 13 12 | 14 15 10 11 | 12 13 8 9 | 10 11 14 15 | 8 9 12 13 |
| 57 59 61 63 | 11 10 15 14 | 9 8 13 12 | 15 14 11 10 | 13 12 9 8 | 10 11 14 15 | 8 9 12 13 | 14 15 10 11 | 12 13 8 9 |

NOTE: POINTS LABELLED AS (Z2,Z3,Z4)

MODEM AND METHOD FOR 8 DIMENSIONAL TRELLIS CODE MODULATION

BACKGROUND OF THE INVENTION

This invention relates to a modem and trellis code modulation and more specifically to a 64-State 8D Encoder having a 20-point 2D constellation.

In communication systems, the received signal constellation may be rotated with respect to the transmitted signal constellation, due to phase hits. Phase hits or jumps occurring in the communication medium may result in a rotation of the received signaling alphabets as compared to the initial determination of phase. This ambiguity in phase can cause errors in all subsequently received data and thereby seriously degrade the performance of the system. This rotation may cause the phase of the received signal to jump permanently to a new value. More specifically, if there is a phase hit, the received signal might be rotated by multiples of 90°.

It is known in the prior art that encoding the data at the transmitter of a modem using a convolutional encoder and performing maximum likelihood (Viterbi) decoding at the receiver decreases the error rate of the modem at a given signal-to-noise ratio (SNR), assuming that the major impairment is Gaussian noise.

The idea of jointly selecting a trellis code and a signal constellation to optimize performance for band limited channels was first discussed by Ungerboeck in his article entitled "Channel Coding with Multilevel/Phase Signals", IEEE Transactions on Information Theory, Vol. IT-28, January 1982, pp. 55–67. Ungerboeck showed that for 2D codes, almost all of the gain theoretically achievable, by adding redundancy through coding and increasing the number of constellation points, could be gained by using a rate $(n-1)/n$ code and a coded constellation with twice the number of points as the uncoded one. Lee-Fang Wei, in an article entitled "Rotationally Invariant Convolutional Channel Coding with Expanded Signal Space—Part II: Nonlinear Codes", IEEE Journal on Selected Areas in Communications, Vol. SAC-2, No. 5, September 1984, pp. 672–686, extended Ungerboeck's ideas and created 2D nonlinear trellis codes that are rotational invariant to 90° phase shifts. One of Wei's codes was selected for the V32 CCITT specification. More recently, Wei discovered multi-dimensional trellis codes that give improved performance over the 2D codes. The codes are designed for encoders that accept seven data bits per baud. This work is referenced in another article by Ungerbocck entitled "Trellis-Coded Modulation with Redundant Signal Sets, Part II: State of the Art", IEEE Communications, Vol., 25, No. 2, February 1987, p. 21 and one of the codes is, also, used in the CODEX 19.2 kbps modem.

SUMMARY OF THE INVENTION

In accordance with the present invention, a 64-state 8D code with a 160-point 2D constellation is replaced with a 64-state 8D code with a 20-point 2D constellation. The new code accepts 4 bits per baud. Thus, a baud rate of 2400 symbols/sec. gives the data rate of 9600 bits per second (bps). The 20-point constellation and the performance of the new code are described herein. Also, described are the 64-State 8D Encoder and the 8D Viterbi Decoder.

An international standard, CCITT V32, exists for a 9600 bps modem. The CCITT V32 includes an uncoded mode with a 16 point 2-dimensional constellation and a coded mode using a 2-dimensional 8-state trellis code with a 32-point 2D constellation. The V32 code gives a 4 dB improvement over the uncoded mode. The present invention gives additional improvement by using a more powerful code. This involves reducing a 160-point constellation to a 20-point constellation. The modem accepts 4 bits/baud and transmits at 2400 baud for a data rate of $4 \times 2400 = 9600$ bps. In the uncoded case, the 4 bits require a 16-point 2D constellation. The code of the present invention gives a 5.23 dB improvement over the uncoded mode.

The standard V32 code has a 32-point 2D constellation versus the 20-point 2D constellation of the present invention. A constellation with fewer points has some very practical advantages. With fewer points, the signal is affected less by channel phase jitter, non-linearity, and noise.

Disclosed is a modem having an 8-dimensional 64-state trellis code that achieves a 5.23 dB performance gain in terms of signal-to-noise ratio over the uncoded $4 \times 4$ QAM V32 mode and a 1.23 dB gain over the standard 2-dimensional 8-state V32 trellis coded mode. The 64-State 8D Encoder (42) operates on blocks of 16 consecutive data bits taken 4 bits per baud over four bauds. The trellis encoder (18) adds one check bit to the 16 data bits and the resulting 17 bits are mapped into an 8D point consisting of a sequence of four 2D signal points each selected from a 20-point 2D constellation. The standard V32 code selects signal points from the 32-point cross 2D constellation. The fact that a 20-point constellation is used, each baud for the 8D code, rather than the 32-point constellation, makes the 8D code of the present invention more immune to phase jitter and channel non-linearities. In addition, when the received baseband signal point is used for equalizer updating and carrier tracking, the 20-point constellation gives more reliable decision directed performance.

OBJECTS OF THE INVENTION

An object of the present invention is to use a modem having an 8D trellis code with a 20-point 2D constellation for transmitting at 9600 bps.

Another object of the present invention is to provide a specific 20-point constellation.

Still a further object of the present invention is to perform a method for the optimum slicing regions.

Another object of the present invention is to provide a method of slicing subsets B, C, and D by rotating the received point by the appropriate multiples of 90° and using the A slicer.

Still another object of the present invention is to provide a trellis code which gives a higher coding gain for high signal-to-noise ratios.

DESCRIPTION OF THE PREFERRED EMBODIMENT

Figure 1:
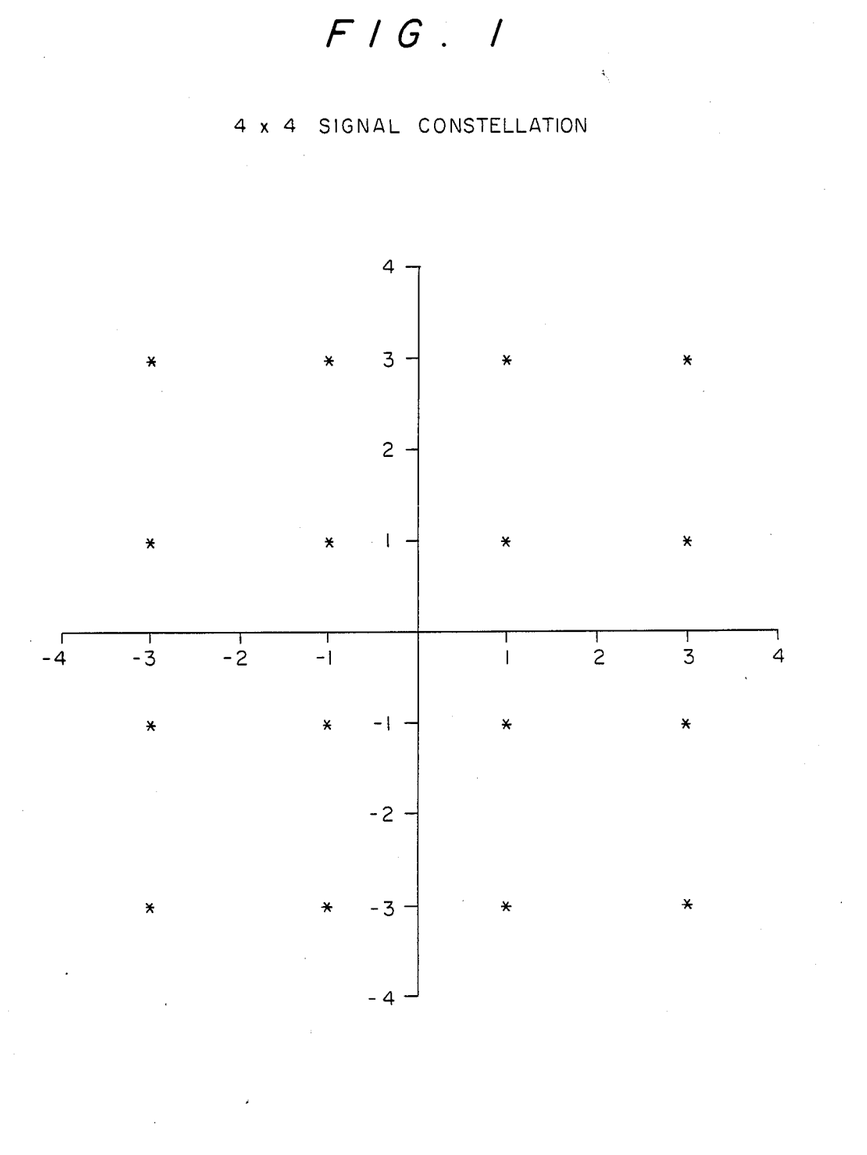
FIG. 1 shows 16 possible signal points of a $4 \times 4$ two dimensional QAM.

An uncoded V32 modulation scheme accepts 4 bits per baud and maps the 16 possible combinations into the 4×4 two dimensional QAM (Quadrature Amplitude Modulation) constellation shown in FIG. 1. The minimum distance between points in this constellation is $d=2$. The average signal power, which is the sum of the squared distances of the signal points from the origin divided by 16, is $S=10=2.5d^2$. The symbol error probability in the presence of additive white Gaussian noise can be shown to be as follows:

$$Pe = 3Q[(SNR/10)^{\frac{1}{2}}] - 2.25Q^2[SNR/10)^{\frac{1}{2}}]$$

where

SNR is the signal-to-noise ratio measured in the Nyquist band and $$Q(x) = \frac{1}{\sqrt{2\pi}} \int_x^\infty e^y \, dt,$$

where $y = -t^2/2$.

The standard V32 trellis encoder also accepts 4 bits per baud. An 8 state rate ⅘ trellis encoder generates one check bit and the resulting 5 bits are mapped to the 32-point cross 2D (D is an abbreviation for dimensional which will be used throughout the specification and claims) constellation. At high signal-to-noise ratios, this code gives a 4.01 dB coding gain over the uncoded 4×4 QAM mode.

Figure 2A:
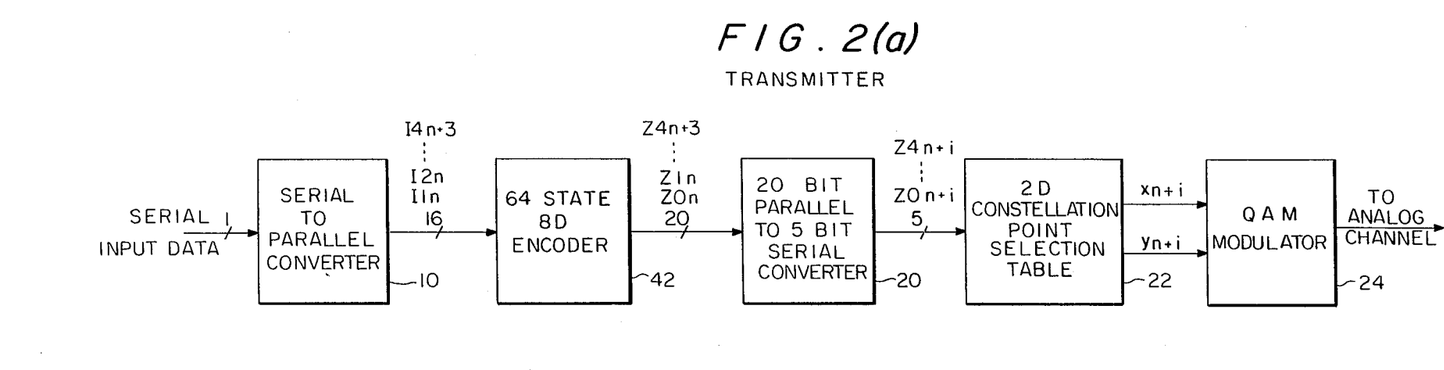
FIG. 2(a) shows a system block diagram for the transmitter.
Figure 2B:
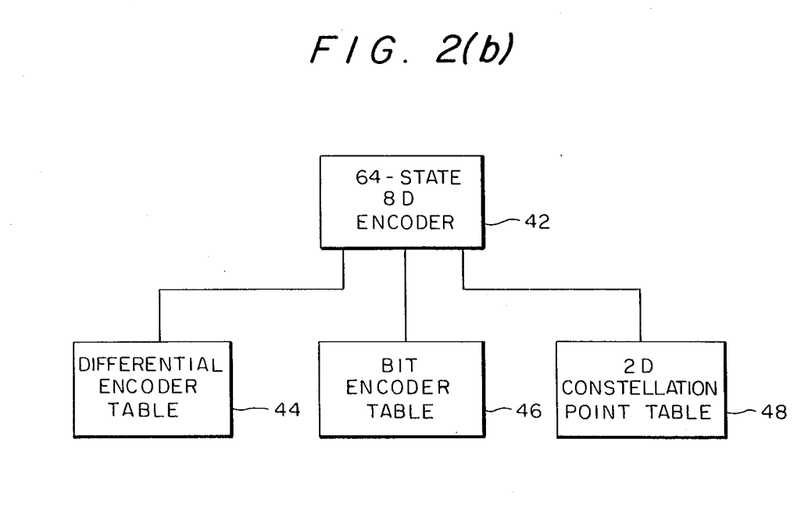
FIG. 2(b) shows a memory block diagram for the 64-State 8D Encoder.

FIGS. 2(a) and (b) show in block diagram the transmitter of the present invention.

Figure 3:
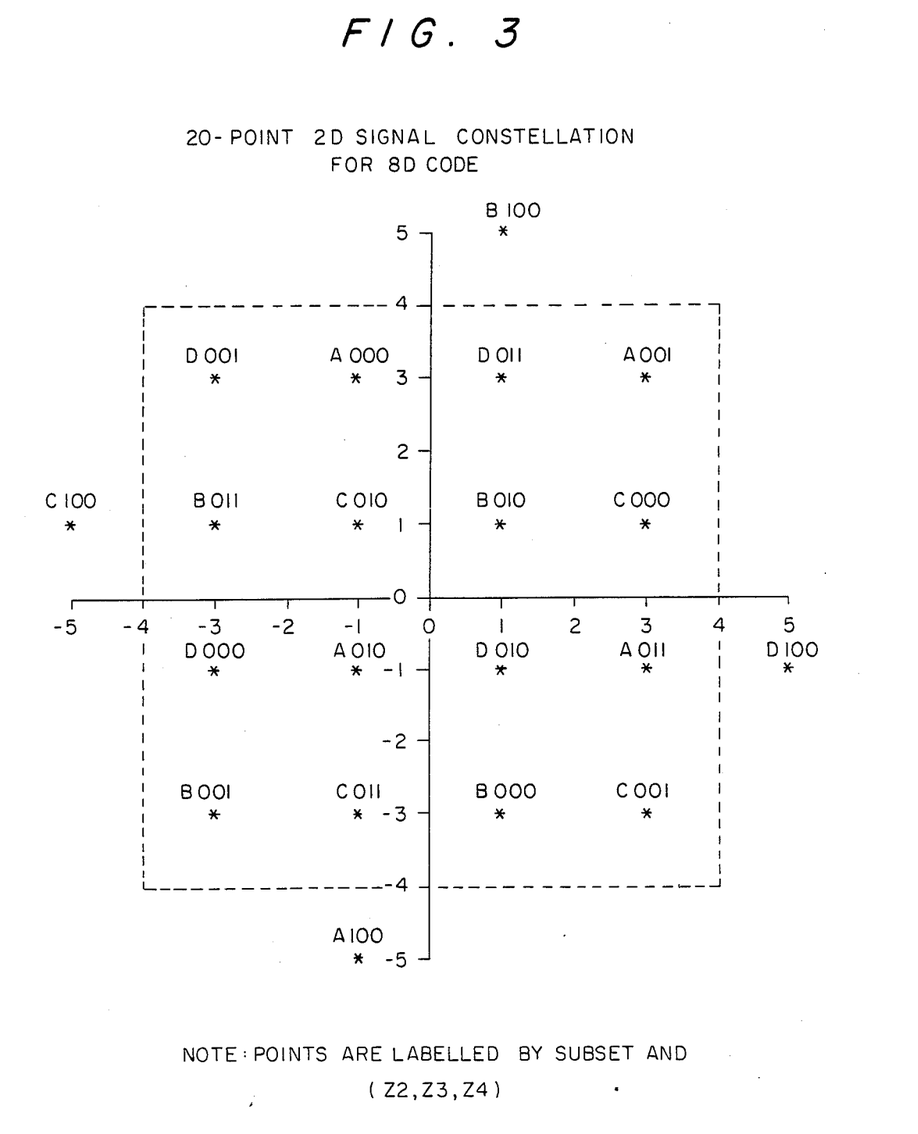
FIG. 3 shows a 20-point 2D signal constellation for the 8D code.

To generate an 8D code that accepts L bits/baud, a 2D constellation of $2^L$ points on a rectangular lattice is first selected. The 64-State 8D Encoder (42) accepts L=4 bits/baud. Thus, the 4×4 constellation as shown in FIG. 1 is selected. These points are called the inner points. A set of $2^L/4=4$ outer points selected from the rectangular lattice to preserve symmetry and have minimum energy are added to the inner points resulting in the 20-point constellation as shown in FIG. 3. The 4×4 set of inner points is shown enclosed by the dotted lines. These 20 points are partitioned into the 4 subsets A, B, C, and D as shown in FIG. 3. Each subset contains 5 points and the minimum distance between points in a subset is df=4. Under 90 degree clockwise rotations, subset A points rotate into subset C points, C rotates into B, B rotates into D, and D rotates into A. This is one reason why the code is transparent to 90 degree rotations.

Figure 4:
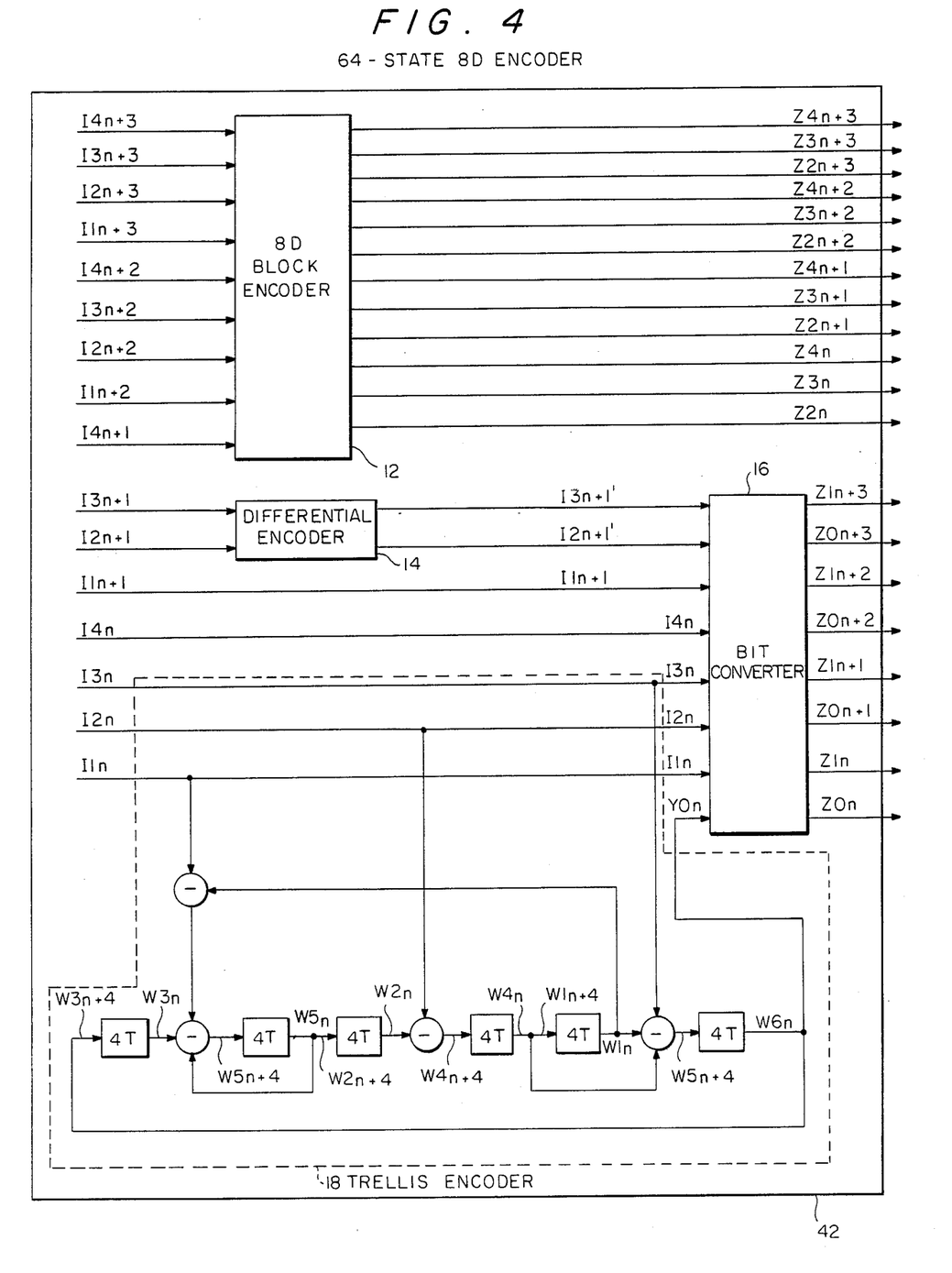
FIG. 4 shows the block diagram of the 64-State 8D Encoder system.

A block diagram of the 64-State 8D Encoder (42) is shown in FIG. 4 and is comprised of a trellis encoder (18) which adds a check bit, a bit converter (16) to convert the eight bits into a sequence of four 2D subsets, and a differential encoder (14) which makes the code transparent to 90 degree rotations. Each of these components is described in more detail hereinafter.

The 64-State 8D Encoder (42) accepts blocks of 16 successive bits from the data source taken four bits per baud. In the block diagram of FIG. 4, these are labelled I1n,I2n,I3n,I4n,I1n+1,I2n+1,I3n+1,I4n+1,I1n+2,I2n+2,I3n+2, I4n+2,I1n+3,I2n+3,I3n+3,I4n+3. The bits are taken from the data source sequentially in time from left to right. The subscripts n, n+1, n+2, and n+3 indicate four successive bauds.

The 9 data bits (I4n+1,I1n+2,I2n+2,I3n+2,I4n+2,I1n+3, I2n+3,I3n+3, and I4n+3) determine the specific 8D point within the 8D subtype. The number of points within an 8D subtype is $2^{17}/256 = 2^9$. This is the number of distinct values the 9 data bits can have.

The 8D BLOCK ENCODER (12) shown in FIG. 4 maps the 9 data bits into the 12 Z bits (Z2n+i, Z3n+i, Z4n+i) for i=0, 1, 2, and 3. These triplets of Z bits specify the sequence of four 2D constellation points corresponding to the sequence of four 2D subsets of the 8D subtype selected. The assignments of (Z2, Z3, and Z4) to 2D points is shown in FIG. 3 and Table 1.

TABLE 1

| Assignment of (Z0, Z1, Z2, Z3, Z4) to Constellation Points | | | | | | | |
|---|---|---|---|---|---|---|---|
| 2D SUBSET | Z0 | Z1 | Z2 | Z3 | Z4 | X | Y |
| A | 0 | 0 | 0 | 0 | 0 | −1 | 3 |
| A | 0 | 0 | 0 | 0 | 1 | 3 | 3 |
| A | 0 | 0 | 0 | 1 | 0 | −1 | −1 |
| A | 0 | 0 | 0 | 1 | 1 | 3 | −1 |
| A | 0 | 0 | 1 | 0 | 0 | −1 | −5 |
| B | 0 | 1 | 0 | 0 | 0 | 1 | −3 |
| B | 0 | 1 | 0 | 0 | 1 | −3 | −3 |
| B | 0 | 1 | 0 | 1 | 0 | 1 | 1 |
| B | 0 | 1 | 0 | 1 | 1 | −3 | 1 |
| B | 0 | 1 | 1 | 0 | 0 | 1 | 5 |
| C | 1 | 0 | 0 | 0 | 0 | 3 | 1 |
| C | 1 | 0 | 0 | 0 | 1 | 3 | −3 |
| C | 1 | 0 | 0 | 1 | 0 | −1 | 1 |
| C | 1 | 0 | 0 | 1 | 1 | −1 | −3 |
| C | 1 | 0 | 1 | 0 | 0 | −5 | 1 |
| D | 1 | 1 | 0 | 0 | 0 | −3 | −1 |
| D | 1 | 1 | 0 | 0 | 1 | −3 | 3 |
| D | 1 | 1 | 0 | 1 | 0 | 1 | −1 |
| D | 1 | 1 | 0 | 1 | 1 | 1 | 3 |
| D | 1 | 1 | 1 | 0 | 0 | 5 | −1 |

The assignment of (Z0, Z1, Z2, Z3, Z4) can be implemented by a 32×2 look-up table (48) such as shown in FIG. 2(b). Notice that when Z2n+i=1 an outer pont is selected and when Z2n+i=0 an inner point is selected. Either a sequence of four inner points or one outer point and three inner points must be selected. The 8D BLOCK ENCODER (12) makes this assignment according to the rules in Table 2.

TABLE 2

| 8D BLOCK ENCODER | | | | | | | | | | | | | | |
|---|---|---|---|---|---|---|---|---|---|---|---|---|---|---|
| I4n+1 | I1n+2 | I2n+2 | Z2n | Z3n | Z4n | Z2n+1 | Z3n+1 | Z4n+1 | Z2n+2 | Z3n+2 | Z4n+2 | Z2n+3 | Z3n+3 | Z4n+3 |
| 0 | x | x | 0 | I1n+2 | I2n+2 | 0 | I3n+2 | I4n+2 | 0 | I1n+3 | I2n+3 | 0 | I3n+3 | I4n+3 |
| 1 | 0 | 0 | 1 | 0 | 0 | 0 | I3n+2 | I4n+2 | 0 | I1n+3 | I2n+3 | 0 | I3n+3 | I4n+3 |
| 1 | 0 | 1 | 0 | I3n+2 | I4n+2 | 1 | 0 | 0 | 0 | I1n+3 | I2n+3 | 0 | I3n+3 | I4n+3 |

TABLE 2-continued

| | | | | | | 8D BLOCK ENCODER | | | | | | | |
|---|---|---|---|---|---|---|---|---|---|---|---|---|---|
| I4n+1 | I1n+2 | I2n+2 | Z2n | Z3n | Z4n | Z2n+1 | Z3n+1 | Z4n+1 | Z2n+2 | Z3n+2 | Z4n+2 | Z2n+3 | Z3n+3 | Z4n+3 |
| 1 | 1 | 0 | 0 | I3n+2 | I4n+2 | 0 | I1n+3 | I2n+3 | 1 | 0 | 0 | 0 | I3n+3 | I4n+3 |
| 1 | 1 | 1 | 0 | I3n+2 | I4n+2 | 0 | I1n+3 | I2n+3 | 0 | I3n+3 | I4n+3 | 1 | 0 | 0 |

The data bit I4n+1 determines if an outer point is included. When I4n+1=0 no outer point is included and when I4n+1=1 an outer point is included. The bits (I1n+2,I2n+2) determine which of the four positions the outer point occupies.

The first three data bits (I1n, I2n, I3n) drive the systematic, rate $\frac{3}{4}$, 64 state, feedback convolutional encoder (18). The rate $\frac{3}{4}$ convolutional encoder (18) generates one check bit from the first three data bits and its present state. The convolutional encoder (18) generates the one check bit labelled Y0n. The logic equations for the trellis encoder (18) are $W1n+4=W4n$ $W2n+4=W5n$ $W3n+4=W6n$ $W4n+4=I2n+W2n$ $W5n+4=I1n+W1n+W3n+W5n$ $W6N+4=I3n+W1n+W4n$ $Y0n=W6n$ The symbol, +, on the right side of the equations represents exclusive or.

Figure 5A:
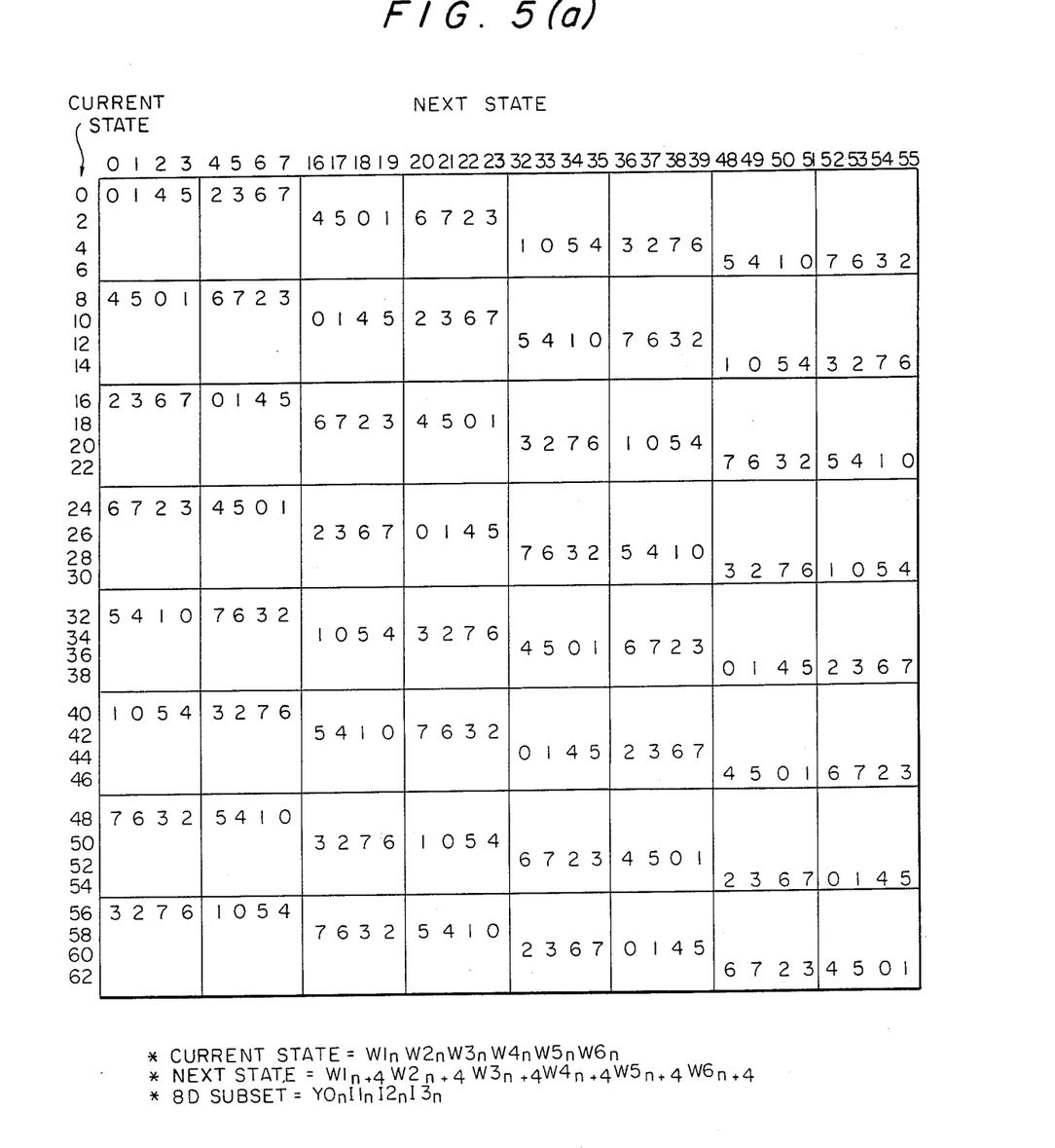
FIG. 5(a) shows the encoder trellis state transitions from even number states to the next state.
Figure 5B:
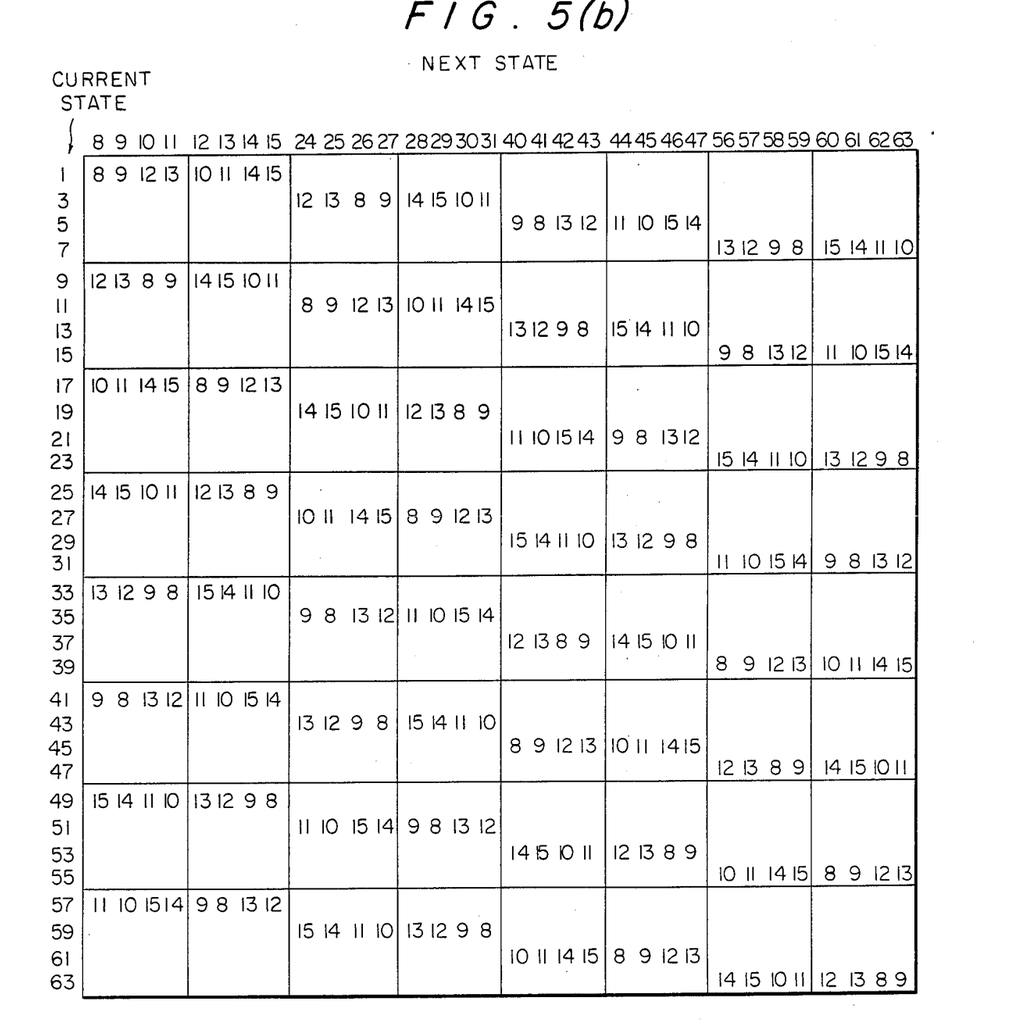
FIG. 5(b) shows the encoder trellis state transitions from odd number states to the next state.

The input bits I1n, I2n, and I3n direct the convolutional encoder (18) through a sequence of states. The trellis-encoder state consists of the six W bits in FIG. 4. Each state can make a transition to eight distinct next states and each state can be arrived at from eight distinct previous states. The three input bits can be uniquely determined from two successive states. An 8D subset is assigned to each state transition. These transitions and subset assignments are displayed as a "trellis" diagram when there are only a few states. In this case, the trellis encoder (18) has 64 states so the transitions and subset assignments have been displayed in FIGS. 5(a) and (b) which can be stored in memory (46).

The resulting 17 bits are mapped to a $2^{17}$ point 8D constellation. The 8D points consist of a sequence of four 2D points each selected from the 20-point 2D constellation of FIG. 3. The 8D points are selected such that at most one outer point is transmitted in the sequence of four 2D points. That is, either four inner points or one outer and three inner points are transmitted per block. The number of ways of selecting all inner points is $N_1 = (2^4)^4 = 2^{16}$ and the number of ways of selecting one outer and three inner points is $N_2 = 4(2^4/4)[(2^4)^3] = 2^{16} = N_1$.

Thus the total number of 8D constellation points is $N_1 + N_2 = 2N_1 = 2^{17}$ which is the required number of points.

The probability of selecting a point from the inner set on a given baud is $Pin = \frac{7}{8}$ and the probability of selecting an outer point on a particular baud is $Pout = \frac{1}{8}$.

This can be shown in the following way. An inner point is selected in the first baud if four inner points are transmitted or if an inner point is transmitted first and one of the remaining three points is an outer point. The number of ways this can happen is $Nin = (2^4)^4 + 3(2^4/4)[(2^4)^3] = (7/4)(2^4)^4$.

The number of ways an outer point can be selected in the first baud is $Nout = (2^4/4)[(2^4)^3] = (\frac{1}{4})(2^4)^4$ then $Pin = Nin/(Nin+Nout)$ and $Pout = 1 - Pin$.

The average transmitted signal power for each baud is $$S = Pin\, Sin + Pout\, Sout$$
$$= (7/8)\, 10 + (1/8)\, 26 = 12.$$

The minimum free Euclidean distance for the 64-State 8D Encoder (42) is equal to the minimum distance between points within one of the 2D subsets which is df=4. At high signal-to-noise ratios, the coding gain is $$G = 10 \log_{10} \frac{(df^2/S)\ \text{coded}}{(d^2/S)\ \text{uncoded}}$$
$$= 10 \log_{10} (16/12)/(4/10) = 5.2287\ \text{dB}.$$

The differential encoder (14) shown in FIG. 4 differentially encodes the bits (I3n+1,I2n+1) to make the code transparent to 90 degree rotations. A truth table for the differential encoder (14) is given in Table 3 which could also be stored in a memory such as memory (44).

TABLE 3

| Differential Encoder Truth Table | | | | | |
|---|---|---|---|---|---|
| I3n+1 | I2n+1 | I3n−3' | I2n−3' | I3n+1' | I2n+1' |
| 0 | 0 | 0 | 0 | 0 | 0 |
| 0 | 1 | 0 | 0 | 0 | 1 |
| 1 | 0 | 0 | 0 | 1 | 0 |
| 1 | 1 | 0 | 0 | 1 | 1 |
| 0 | 0 | 0 | 1 | 0 | 1 |
| 0 | 1 | 0 | 1 | 1 | 0 |
| 1 | 0 | 0 | 1 | 1 | 1 |
| 1 | 1 | 0 | 1 | 0 | 0 |
| 0 | 0 | 1 | 0 | 1 | 0 |
| 0 | 1 | 1 | 0 | 1 | 1 |
| 1 | 0 | 1 | 0 | 0 | 0 |

TABLE 3-continued

| Differential Encoder Truth Table | | | | | |
|---|---|---|---|---|---|
| I3n+1 | I2n+1 | I3n−3' | I2n−3' | I3n+1' | I2n+1' |
| 1 | 1 | 1 | 0 | 0 | 1 |
| 0 | 0 | 1 | 1 | 1 | 1 |
| 0 | 1 | 1 | 1 | 0 | 0 |
| 1 | 0 | 1 | 1 | 0 | 1 |
| 1 | 1 | 1 | 1 | 1 | 0 |

If the pairs of bits are considered to be two bit binary numbers, the differential encoding rule is (I3n+1', I2n+1')=(I3n+1, I2n+1)+(I3n-3', I2n-3') mod 4. Here the symbol, +, on the right side represents ordinary decimal addition. The differential decoder in the receiver performs the inverse operation and is also described by Table 3 for the equation (I3n+1, I2n+1)=(I3n+1', I2n+1')−(I3n-3', I2n-3') mod 4.

The $2^{17}$ 8D constellation points are partitioned into 16 subsets labelled 0, 1, . . . 15. The subsets are formed by first partitioning the 20-point 2D constellation into the four subsets, A, B, C, and D as shown in FIG. 3. The minimum Euclidean distance between points within a 2D subset is d=4. Next, eight 4D subsets are formed by concatenating pairs of 2D subsets as shown in Table 4.

TABLE 4

| Partitioning of 4D Constellation into 8 Subsets | |
|---|---|
| 4D SUBSET | 4D TYPES |
| 0 | (A,A), (B,B) |
| 1 | (C,C), (D,D) |
| 2 | (A,B), (B,A) |
| 3 | (C,D), (D,C) |
| 4 | (A,C), (B,D) |
| 5 | (C,B), (D,A) |
| 6 | (A,D), (B,C) |
| 7 | (C,A), (D,B) |

The minimum Euclidean distance between points in the 4D subsets is also 4. Finally, pairs of 4D subsets are combined to form sixteen 8D subsets as shown in Table 5.

TABLE 5

| Partitioning of 8D Constellation into 16 Subsets | | | | | |
|---|---|---|---|---|---|
| 8D Sublattice (Subset) | YO$_n$ | I1$_n$ | I2$_n$ | I3$_n$ | 8D Types |
| 0 | 0 | 0 | 0 | 0 | (0,0), (1,1), (2,2), (3,3) |
| 1 | 0 | 0 | 0 | 1 | (0,1), (1,0), (2,3), (3,2) |
| 2 | 0 | 0 | 1 | 0 | (0,2), (1,3), (2,0), (3,1) |
| 3 | 0 | 0 | 1 | 1 | (0,3), (1,2), (2,1), (3,0) |
| 4 | 0 | 1 | 0 | 0 | (4,4), (5,5), (6,6), (7,7) |
| 5 | 0 | 1 | 0 | 1 | (4,5), (5,4), (6,7), (7,6) |
| 6 | 0 | 1 | 1 | 0 | (4,6), (5,7), (6,4), (7,5) |
| 7 | 0 | 1 | 1 | 1 | (4,7), (5,6), (6,5), (7,4) |
| 8 | 1 | 0 | 0 | 0 | (0,4), (1,5), (2,6), (3,7) |
| 9 | 1 | 0 | 0 | 1 | (0,5), (1,4), (2,7), (3,6) |
| 10 | 1 | 0 | 1 | 0 | (0,6), (1,7), (2,4), (3,5) |
| 11 | 1 | 0 | 1 | 1 | (0,7), (1,6), (2,5), (3,4) |
| 12 | 1 | 1 | 0 | 0 | (4,0), (5,1), (6,2), (7,3) |
| 13 | 1 | 1 | 0 | 1 | (4,1), (5,0), (6,3), (7,2) |
| 14 | 1 | 1 | 1 | 0 | (4,2), (5,3), (6,0), (7,1) |
| 15 | 1 | 1 | 1 | 1 | (4,3), (5,2), (6,1), (7,0) |

It should be noted that the integers under the column labelled 8D types refer to the 4D types defined in Table 4.

Again, the minimum Euclidean distance between points in an 8D subset is 4. Each 8D subset consists of four 8D types and each 8D subset type contains four 8D subtypes so that each 8D subset contains sixteen 8D subtypes. Thus, there are 16×16=256 8D subtypes. The four bits (I3n, I2n, I1n, YOn) determine the 8D type, while the four bits (I3n+1', I2n+1', I1n+1, I4n) determine the subtype within the 8D type.

The bit converter (16) shown in FIG. 4 maps these eight bits into a sequence of four 2D subsets specified by the eight Z bits, Z1n, ZOn, Z1n+1, ZOn+1, Z1n+2, ZOn+2, Z1n+3, ZOn+3). Each pair (Z1, ZO) specifies a 2D subset according to the following rule.

| Z1 | ZO | 2D subset |
|---|---|---|
| 0 | 0 | A |
| 0 | 1 | C |
| 1 | 0 | B |
| 1 | 1 | D |

Notice that these are assigned so that under 90 degree clockwise rotations, each 2D subset becomes the one below it. An algorithm for selecting the 8D subtype is shown in Table 6.

TABLE 6

| 8D Subtype Selection Procedure | | | | |
|---|---|---|---|---|

STEP 1

Use YOn, I1n, I2n, and I3n to select an 8D subtype from this table

| YO$_n$ | I1$_n$ | I2$_n$ | I3$_n$ | 8D SUBTYPE |
|---|---|---|---|---|
| 0 | 0 | 0 | 0 | (A A A A) |
| 0 | 0 | 0 | 1 | (A A C C) |
| 0 | 0 | 1 | 0 | (A A A B) |
| 0 | 0 | 1 | 1 | (A A C D) |
| 0 | 1 | 0 | 0 | (A C A C) |
| 0 | 1 | 0 | 1 | (A C C B) |
| 0 | 1 | 1 | 0 | (A C A D) |
| 0 | 1 | 1 | 1 | (A C C A) |
| 1 | 0 | 0 | 0 | (A A A C) |
| 1 | 0 | 0 | 1 | (A A C B) |
| 1 | 0 | 1 | 0 | (A A A D) |
| 1 | 0 | 1 | 1 | (A A C A) |
| 1 | 1 | 0 | 0 | (A C A A) |
| 1 | 1 | 0 | 1 | (A C C C) |
| 1 | 1 | 1 | 0 | (A C A B) |
| 1 | 1 | 1 | 1 | (A C C D) |

STEP 2

Rotate the 2nd & 4th 2D subsets of the 8D subtype by 180
        3rd & 4th
        2nd & 3rd degrees if (I4n, I1n + 1) = $\begin{matrix} 0\,1 \\ 1\,0 \\ 1\,1 \end{matrix}$

STEP 3

Rotate all four 2D subsets of the 8D subtype obtained in STEP 2 by 90
180 degrees clockwise if (I2n + 1', I3n + 1') = $\begin{matrix} 0\,1 \\ 1\,0 \\ 1\,1 \end{matrix}$
270

This method can be implemented using a 256 byte look-up table.

Figure 6A:
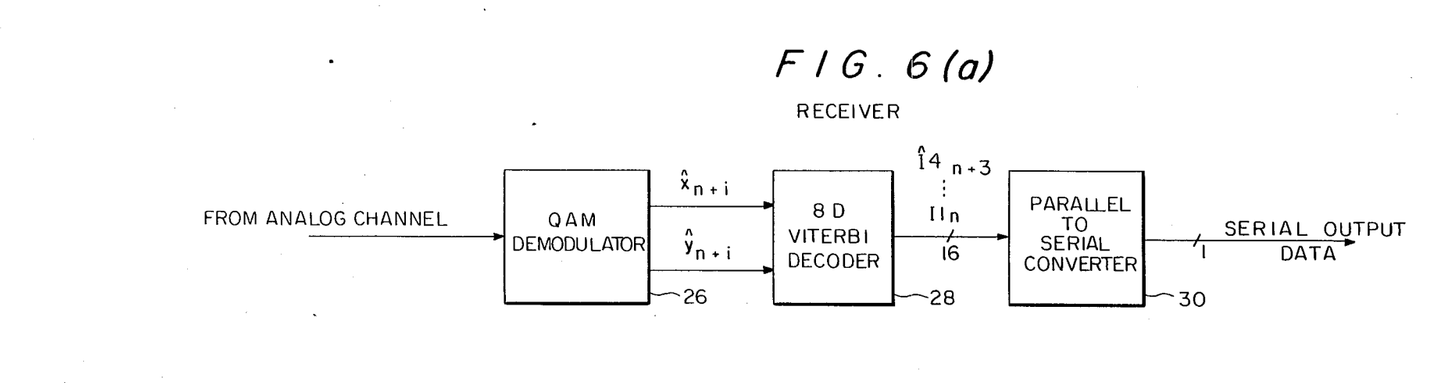
FIG. 6(a) shows the system block diagram for the receiver.
Figure 6B:
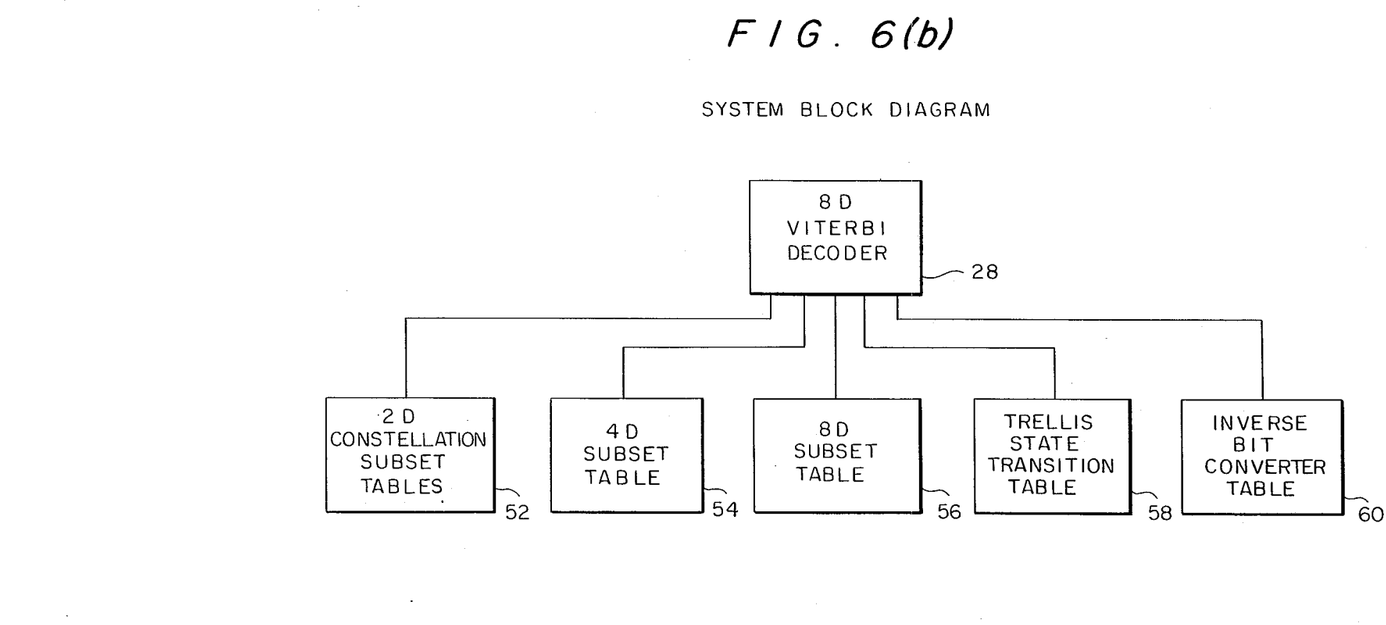
FIG. 6(b) shows a memory block diagram for the 8D Viterbi Decoder.
Figure 7:
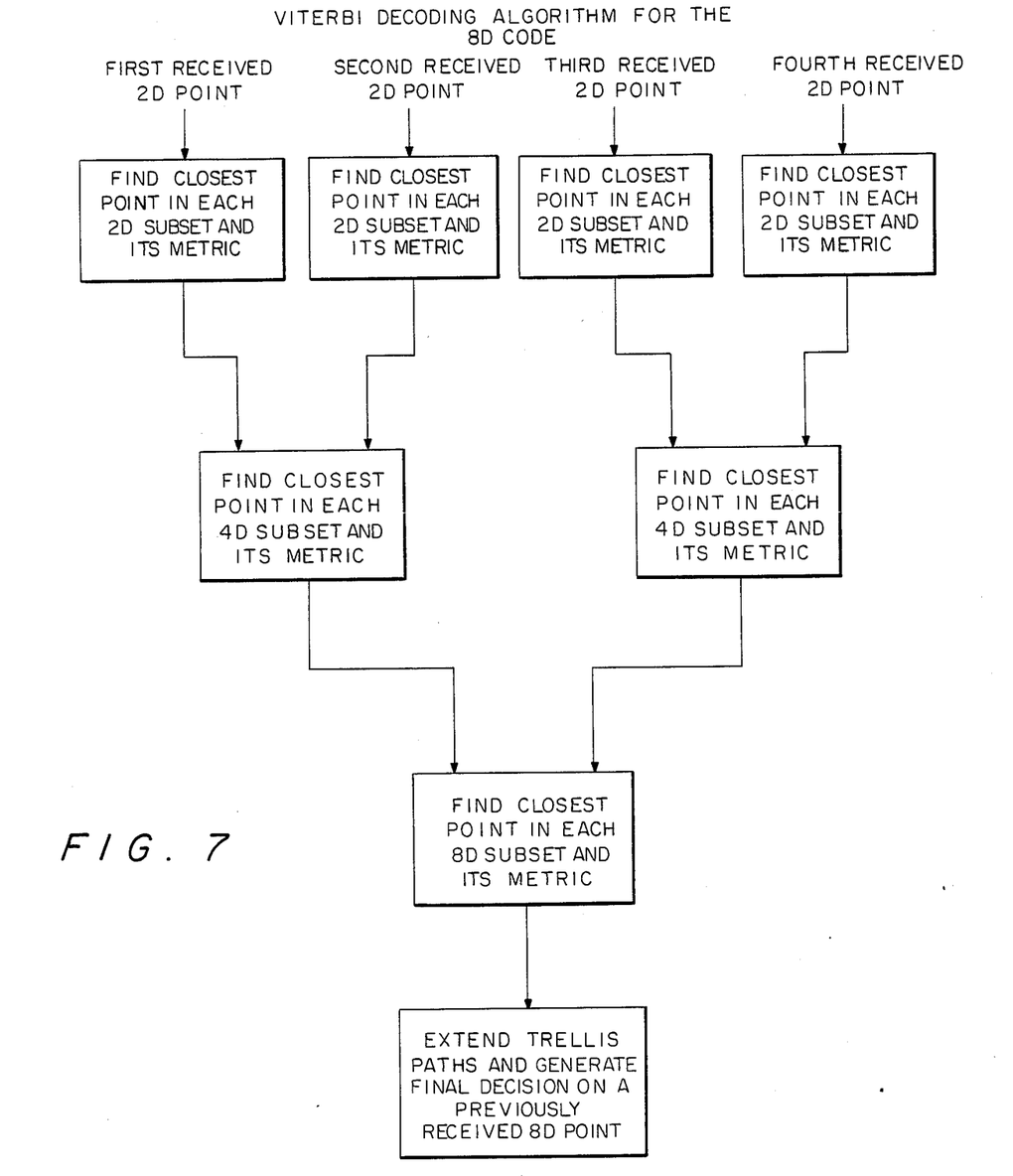
FIG. 7 shows the general flow chart for the 8D Viterbi Decoder.

A block diagram of the receiver system is shown in FIGS. 6(a) and (b). The demodulator (26) sends received 2D symbols to the 8D Viterbi Decoder (28). The general flow chart for the 8D Viterbi Decoder (28) is shown in FIG. 7. Each 2D symbol consists of a pair of x and y coordinates that represent the baseband received 2D symbol. Each block of four consecutive 2D symbols is a received 8D symbol. The 8D Viterbi Decoder (28) must first quantize the received 8D point to the nearest point in each of the sixteen 8D subsets. This can be efficiently accomplished by going from 2D to 4D to 8D decisions as described hereinafter.

In the decoding process, each received 2D point must be sliced to the nearest point in each of the four 2D subsets. These subsets are labelled A, B, C, and D. Each subset contains 5-points and a 90° rotation of any subset becomes another subset. The optimum way to slice a received point is to choose the closest ideal point. Since each subset is a 90° rotation of subset A, their slicers can be implemented by first rotating the received point by the appropriate multiple of 90° and then using the A slicer.

The 8D Viterbi Decoder (28) first quantizes each received 2D symbol to the closest constellation point in each of the 2D subsets A, B, C, and D. For each of these four subsets, the 8D Viterbi Decoder (28) saves the Z bits (Z2, Z3, Z4) and the corresponding squared Euclidean distance between the received and quantized points. If the received point is (X, Y) and the ideal point is (x, y), the squared Euclidean distance is $$d^2 = (X-x)^2 + (Y-y)^2.$$

This process is performed for a block of four 2D symbols that make up an 8D symbol.

Figure 8:
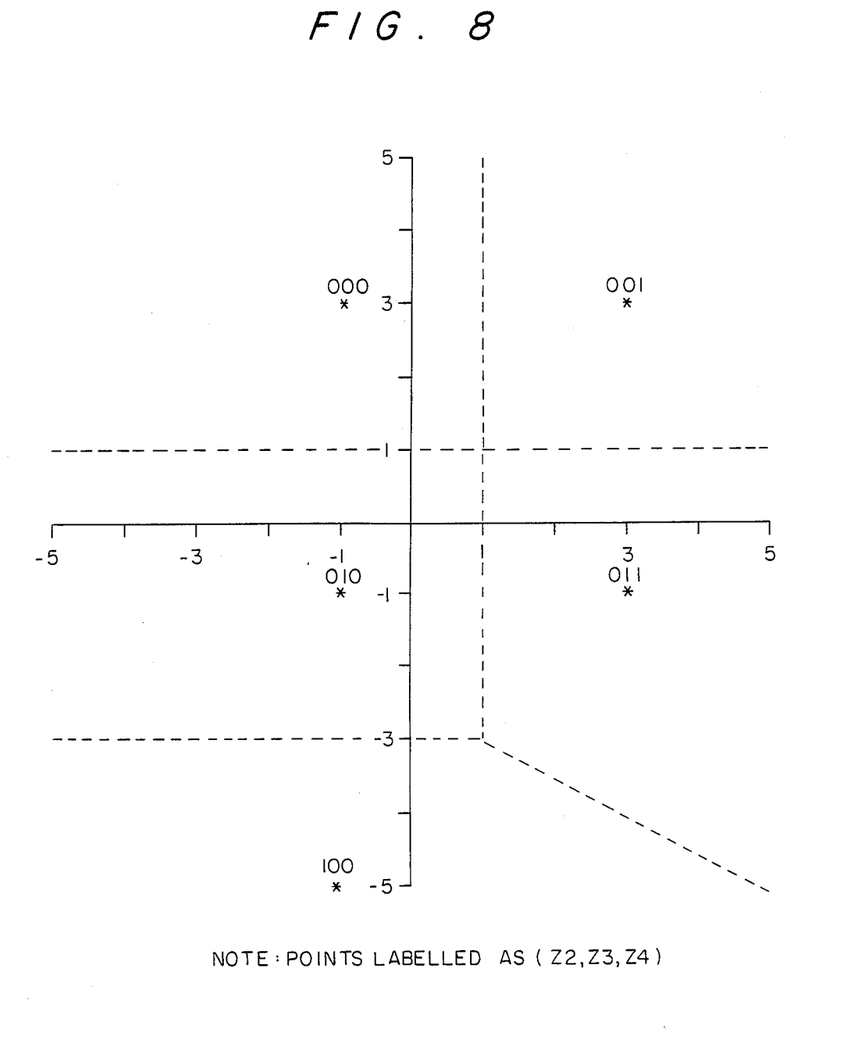
FIG. 8 shows the optimum decision regions for subset A.

The optimum decision regions for subset A are shown in FIG. 8. The equations describing each decision region are given in Table 7.

TABLE 7

| 2D A Subset Decision Regions | |
|---|---|
| (Z2, Z3, Z4) | Decision Region |
| 0 0 0 | x < 1 and y > 1 |
| 0 0 1 | x > 1 and y > 1 |
| 0 1 0 | x < 1 and −3 < y < 1 |
| 0 1 1 | x > 1 and −3 < y < 1 |
| | or |
| | −x−2 < y < −3 |
| 1 0 0 | y < −3 and y < −x−2 |

Under 90 degree clockwise rotations, A→C→B→D, the decoder (28) can use the subset A slicing routine for the C, B, and D subsets also by rotating the received 2D point by 90, 180, and 270 degrees counterclockwise, respectively. Using this method, the 90 degree counterclockwise rotation of the point (x, y) is (x, y) rotated 90 degrees counterclockwise = (−y, x).

The next step is to combine pairs of 2D decisions into two 4D decisions. Let the squared Euclidean distance determined in the 2D decisions previously described for 2D subset "s" in baud n+i be as follows, $$d(s,n+i) \text{ for } s = A, B, C, \text{ or } D \text{ and } i = 0, 1, 2, \text{ or } 3.$$

For the first pair of received 2D symbols each of the eight 4 subsets listed in Table 4 is compared and the point that has the smallest squared Euclidean distance in the pair of 4D types associated with the subset is selected. Next, the associated set of Z bits and corresponding squared distances are recorded. The process is repeated for the second pair of received 2D symbols and so forth. For example, consider the first pair of received 2D symbols and 4D subset 0 of Table 4.

TABLE 4

| Partitioning of 4D Constellation into 8 Subsets | |
|---|---|
| 4D SUBSET | 4D TYPES |
| 0 | (A,A), (B,B) |
| 1 | (C,C), (D,D) |
| 2 | (A,B), (B,A) |
| 3 | (C,D), (D,C) |
| 4 | (A,C), (B,D) |
| 5 | (C,B), (D,A) |
| 6 | (A,D), (B,C) |
| 7 | (C,A), (D,B) |

The best point in (A,A) or (B,B) must be found. The two 4D squared Euclidean distances are calculated as $$D_4(0,0) = d(A,n) + d(A,n+1) \text{ for A,A)}$$

and $$D_4(0,1) = d(B,n) + d(B,n+1) \text{ for (B,B)}.$$

Next, the two D's are compared and the smallest is retained together with the Z bits for the corresponding pair of 2D subsets. The same operation is performed for 4D subsets 1, 2, 3, 4, 5, 6 and 7.

The next step is to combine the 4D decisions described into 8D decisions, one for each of the sixteen 8D subsets defined in Table 5.

TABLE 5

| Partitioning of 8D Constellation into 16 Subsets | | | | | |
|---|---|---|---|---|---|
| 8D Sublattice (Subset) | Y0$_n$ | I1$_n$ | I2$_n$ | I3$_n$ | 8D Types |
| 0 | 0 | 0 | 0 | 0 | (0,0), (1,1), (2,2), (3,3) |
| 1 | 0 | 0 | 0 | 1 | (0,1), (1,0), (2,3), (3,2) |
| 2 | 0 | 0 | 1 | 0 | (0,2), (1,3), (2,0), (3,1) |
| 3 | 0 | 0 | 1 | 1 | (0,3), (1,2), (2,1), (3,0) |
| 4 | 0 | 1 | 0 | 0 | (4,4), (5,5), (6,6), (7,7) |
| 5 | 0 | 1 | 0 | 1 | (4,5), (5,4), (6,7), (7,6) |
| 6 | 0 | 1 | 1 | 0 | (4,6), (5,7), (6,4), (7,5) |
| 7 | 0 | 1 | 1 | 1 | (4,7), (5,6), (6,5), (7,4) |
| 8 | 1 | 0 | 0 | 0 | (0,4), (1,5), (2,6), (3,7) |
| 9 | 1 | 0 | 0 | 1 | (0,5), (1,4), (2,7), (3,6) |
| 10 | 1 | 0 | 1 | 0 | (0,6), (1,7), (2,4), (3,5) |
| 11 | 1 | 0 | 1 | 1 | (0,7), (1,6), (2,5), (3,4) |
| 12 | 1 | 1 | 0 | 0 | (4,0), (5,1), (6,2), (7,3) |
| 13 | 1 | 1 | 0 | 1 | (4,1), (5,0), (6,3), (7,2) |
| 14 | 1 | 1 | 1 | 0 | (4,2), (5,3), (6,0), (7,1) |
| 15 | 1 | 1 | 1 | 1 | (4,3), (5,2), (6,1), (7,0) |

It is important to note that the integers under the column labelled 8D types refer to the 4D types defined in Table 4.

For each of the 8D subsets, four 8D types must be compared. The squared Euclidean distances for the 8D types are the sums of the corresponding pairs of 4D distances computed as previously described. Again, the smallest distance for each 8D subset is saved along with the corresponding Z bits.

The procedure just described for finding the closest 8D constellation point to the received 8D point can fail in one way. This procedure does not guarantee that at most one outer point appears in the sequence of four 2D symbols. The decoder (28) could check if more than one outer point was selected and go back and alter intermediate decisions. However, the probability that this occurs is very small and the easiest strategy would be to move the 2D outer points with largest squared Euclidean distance to the nearest inner points in the same 2D subset so that the resulting 8D point has only one 2D outer point.

Now the Viterbi algorithm is performed to update the decoder trellis paths. A general description of the algorithm will be given first. The basic principle of the Viterbi algorithm is that for each received 8D symbol, the best path to each of the 64 possible encoder states is determined. The best path to a state is the one with the smallest cumulative sum of squared Euclidean distances and is called the survivor to the state. The corresponding cumulative squared Euclidean distance is called the surviving metric for the state. This operation is performed for each new received 8D symbol recursively. There are 8 possible paths that can converge to each state and these can be determined from the encoder state transition equations or from FIGS. 5(a) and (b) along with the 8D subset associated with the transition. For each present state, the eight metrics for the paths that can enter the state are computed from the metrics for the eight possible previous states and the squared Euclidean distances for the subsets corresponding to the transitions. The smallest of the eight resulting metrics is selected and the corresponding previous state is designated as the best previous state. This operation is repeated for each of the present 64 states. In principle, this process should be repeated for the entire transmitted message with the resulting best path selected as the decoded message. In practice, the trellis can only be stored for some time into the past. Therefore, the present state with the smallest metric is selected and the symbol farthest back in the trellis on the path leading to this state is selected as the estimate of the transmitted symbol for that time instant.

Some details of the 8D Viterbi Decode: (28) implementation will now be described. These principles can be applied in any programmed implementation. For each received 3D symbol, an array of 64 records is created, one record for each encoder state. The arrays for successive received 8D symbols are stored in a circular buffer. A record for current state i consists of the best previous state leading to state i and the twenty Z bits for the best 8D point in the subset corresponding to the state transition. A 64×2 array is used to store the surviving metrics. Half this array is used to store the surviving metrics for the previous 8D symbol while the other half is used to store the surviving metrics being determined for the present symbol. Two 64 word arrays are required since the previous metrics are used in computing the metrics for several present states and cannot be destroyed before they are used for all the metric updates. The new surviving metrics are written into the half of the array that has metrics for two symbols ago and, hence, flip-flop between the two array halves for successive symbols. Metrics for states farther back in the trellis than the previous state are not needed. Let $D(k,i)$ be the surviving metric at the current 8D symbol time k for state i, and $d(k-1,k,i,j)$ be the squared Euclidean distance for the 8D symbol determined by the quantization of the received 8D symbol described above for the 8D subset specified by the transition from state j at time $k-1$ to state i at the present time k. Also let $J(i)$ be the set of eight previous states that can converge to state i. The metrics are updated by performing the following calculation for i=0, ..., 63:

$$D(k,i) = \min [D(k-1,j) + d(k-1,k,i,j)]$$
$$j \text{ in } J(i).$$

The value of j that gives the minimum is the best previous state converging to state i. As described hereinabove, the encoder state transition information is stored in a table. There are 64 records in the table, one for each present state. The first eight entries in a record i are the states that can converge to state i and are the set $J(i)$. The second eight entries are the 8D subsets corresponding to the transitions from j to i. Using this table in evaluating $D(k,i)$ is the most computationally efficient method. The surviving metrics $D(k,i)$ grow monotonically with k. Therefore, in a practical implementation the size of the metrics should be checked periodically, and if they become too large, a constant should be subtracted from all 64 of them. A reasonable choice for this constant is the smallest metric. This resets the smallest metric to zero. Since the surviving metrics correspond to the best path to each state, these metrics tend to remain close in size.

Once the metrics are updated, the next step is to find the current state, $i^*$, with the smallest metric. Starting with this state, the trellis is traced back to its end. The trellis record for $i^*$ points to the record for the previous best state leading to $i^*$ which points to the record for its previous best state, etc. The decoded 20 Z bits are found at the end of the trellis path.

The final step is to convert the twenty Z bits back into sixteen data bits. The eight Z bits Z0n, Z1n, Z0n+1, Z1n+1, Z0n+2, Z1n+2, Z0n+3, Z1n+3 can be converted into the seven information bits I1n, I2n, I3n, I4n, I1n+1, I2n+1′, I3n+1′ most easily by using a table look-up memory such as a 256 entry table. This table can be generated by first forming a bit converter table using the rules in Table 6 and then forming an inverse bit converter table from it. Bits I2n+1′ and I3n+1′ must be differentially decoded to I2n+1 and I3n+1. This can be performed quickly by a 16 entry table with input (I2n-3′, I3n-3′, I2n+1′, I3n+1′) and output (I2n+1, I3n+1) as shown in Table 3. Alternatively, it can be performed by subtraction module 4 as previously shown. The remaining twelve Z bits could be 8D block decoded by a table look-up memory also. However, this memory table will be relatively large. A more practical method would be to use a software procedure to perform the inverse of the 8D Block Encoder operations described in Table 2.

The major portion of the decoder computation is trellis updating. This requires additions and comparisons. The decoder (28) must also form squared Euclidean distances which requires multiplication or a large look-up table memory. Storage for the trellis with depth between 16 and 32 is also required. An ordinary microprocessor would perform the required computation quite slowly. However, a digital signal processor comparable to the TMS320C25 will be fast enough and allow access to sufficient internal and external RAM and ROM.

Changes and modifications in the specifically described embodiments can be carried out without departing from the scope of the invention which is intended to be limited only by the appended claims.

What is claimed is:

1. A modem for modulation-demodulation of received analog signals including a demodulator comprising:
    receiving means for receiving analog signals comprised of four 2D points;
    means for storing a plurality of ideal 2D points comprising a twenty point 2D signal constellation, said twenty point 2D signal constellation comprised of four 2D subsets of points;

slicing means connected to said receiving means including a set of rules for finding the best ideal 2D point in each of said four 2D subsets to each of said received four 2D points by locating the ideal 2D point closest in Euclidean distance;

first combining means connected to said slicing means for combining into pairs each of said ideal 2D points to form 4D points in each of eight 4D subsets and selecting one of said pairs of ideal 2D points in each of said 4D subsets to represent the best 4D point in each of said 4D subsets;

second combining means connected to said first combining means for combining into pairs each of said best eight 4D points to form sixteen 8D points and comparing said pairs of four 4D points with a set of allowed points in each of sixteen 8D subsets and selecting one of said 8D points to represent the best 8D point in each of the sixteen 8D subsets;

decoding means connected to said second combining means for extending a decoder trellis for implementing a Viterbi algorithm and generating as output 20 Z-bits corresponding to the best 8D point;

converting means connected to said decoding means for converting said 20 Z-bits into a stream of 16 data bits; and sending means connected to said converting means for sending said data bits to a data sink.

2. The modem for modulation-demodulation of claim 1 wherein each of said four 2D points comprises a pair of x and y coordinates representing said analog signal.

3. The modem of claim 1 wherein said set of rules of said slicing means are such that each of said received 2D points is rotated a multiple of 90 degrees to find the best ideal 2D point in each of said four 2D subsets.

4. A modem for modulation-demodulation of a received analog signal, said modem comprising:

means for receiving blocks of 16 successive bits from a data source at four bits per baud;

means for designating 9 bits of said 16 successive bits for determining a specific 8D point of a plurality of 8D points forming an 8D subtype;

mapping means for mapping the 9 bits into 12 Z-bits such that successive groups of three Z-bits specify a sequence of four 2D points from within a particular 2D subset of points comprising a 20 point 2D signal constellation, said 20 point signal constellation being formed from a 16 point signal constellation and comprising all of said points of said 16 point signal constellation and additional points not part of said 16 point signal constellation; and means for assigning a point not part of said 16 point constellation to one of said sequence of four 2D points if a specific one of the three Z-bits equals logic one, and assigning a point part of said 16 point constellation to one of said sequence of four 2D points if a specific one of the three Z-bits equals logic zero.

5. The modem of claim 4, and further comprising:
a convolutional encoder means;

means for driving said convolutional encoder means so that a check bit is generated from the first three bits of the received 16 bits; and further mapping means for mapping said 16 bits and said check bits into a $2^{17}$ point 8D signal constellation where the 8D points consist of a sequence of four 2D points, said 2D points being selected from the 20 point 2D constellation so that the 8D points are formed in order that at most one point not part of said 16 point signal constellation is transmitted in the sequence of four 2D points and whereby either four points part of said 16 point signal constellation, or one point not part of said 16 point constellation and three points part of said 16 point constellation are transmitted per block of said 16 successive bits.

6. A method of decoding an analog signal comprised of 2D symbols, said method comprising the steps of:

(a) quantizing each received 2D symbol to the closest symbol in each of four 2D subsets A, B, C, or D, said four 2D subsets comprising a 2D signal constellation;

(b) storing Z-bits representing each of the four subsets together with the corresponding smallest squared Euclidean distance between the received and quantized symbols;

(c) performing steps of (a) and (b) for a block of four 2D symbols that make up an 8D symbol;

(d) rotating the received 2D symbols by 90, 180, and 270 degrees counterclockwise, respectively:

(e) combining pairs of 2D quantized symbols into two 4D quantized symbols and comparing each 4D symbol with an ideal 4D symbol for selecting the 4D symbol with the smallest squared Euclidean distance from said ideal 4D symbol;

(f) storing the 4D symbol with the smallest squared Euclidean distance together with the Z-bits of the corresponding pair of 2D subsets;

(g) combining the 4D quantized symbols into 8D symbols and comparing each 8D symbol with an ideal 8D symbol for selecting the 8D symbol with the smallest squared Euclidean distance from said ideal 8D symbol;

(h) storing the smallest distance of said 8D symbol long with the Z-bits of the corresponding 2D subsets; and (i) performing a Viterbi algorithm to update the best trellis path to each of 64 possible encoder states corresponding to each quantized 8D symbol.

7. A modem for modulation-demodulation of received analog signals including a demodulator comprising:

quantizing means for performing quantizing decisions on each received 2D symbol to the closest constellation point in each of four 2D subsets A, D, C, or D;

storing means for storing Z-bits representing each of the four subsets with the corresponding squared Euclidean distance between the received and quantized points;

means for rotating the received 2D point by 90, 180, and 270 degrees counterclockwise, respectively;

combining means for combining pairs of 20 quantizing decisions into two 4D quantizing decisions by comparing a 4D subset containing pairs of 2D points and selecting the point within each 4D subset having the smallest squared Euclidean distance from an ideal 4D point; and second storing means for storing the 4D point with smallest squared Euclidean distance together with the Z-bits for the corresponding pair of 2D subsets.

8. The modem of claim 7 further comprising:
second combining means for combining the 4D quantizing decision into 8D quantizing decisions and comparing the 8D quantizing decisions with an ideal 8D point and selecting the one with the smallest squared Euclidean distance from said ideal 8D point;

third storing means for storing the smallest distance along with the corresponding Z-bits; and means for performing a Viterbi algorithm to update the best trellis path through each of 64 possible encoder states, for generating as output 20 bits.

9. A method of encoding received data comprising the steps of:

receiving blocks of 16 successive data bits from a data source at four bits per baud;

driving a convolutional encoder means so that a check bit is generated from the first three data bits of the received 16 bits;

differentially encoding the sixth and seventh bits of the received 16 bits to make the code transparent to 90 degree rotations;

designating the last 9 bits of said 16 successive data bits for encoding a specific 8D point within an 8D subtype;

mapping said last 9 bits into 12 Z-bits where every three Z-bits specifies a sequence of four 2D constellation points corresponding to a sequence of four 2D subsets of an 8D subtype selected;

assigning a point outside a conventional 2D 16 point signal constellation to one of said four 2D subsets if and only if a specific one of said three Z-bits equals logic one;

mapping said 16 bits and said check bit into a $2^{17}$ point 8D constellation where the 8D points consist of a sequence of four 2D points, each selected from a 20-point 2D signal constellation which includes all of said points of said conventional 2D 16 point signal constellation so that the 8D points are selected in order that at most one point outside said conventional 16 point signal constellation is transmitted in the sequence of four 2D points; and generating from said check bit, said differentially encoded bits, and the first 5 bits of said 16 bits, eight additional Z-bits for specifying a sequence of four 2D subsets so that each pair of Z-bits comprising said eight Z-bits is assigned to a 2D subset which when rotated by 90° becomes the 2D subset below assigned 2D subset.

10. A modem for modulation and demodulation including a modulator for accepting a stream of sixteen consecutive data bits at four bits per baud representing a portion of an analog signal and generating an 8D signal constellation from a twenty point 2D signal constellation comprised of four 2D subsets of 2D points, said modulator comprising:

a convolutional encoder which accepts as input the first three bits of said 16 bits data stream and generates as output the same first three data bits plus one additional bit designed a check bit;

a differential encoder which accepts as input the sixth and seventh bits of said 16 bit data stream and generates as output two new bits;

a bit converter which accepts as input the first five bits of said 16 bit data stream, said check bit, and said differential encoder output bits and generates as output 8 Z-bits comprised of four pairs of Z-bits;

a block encoder which accepts as input the remaining 9 bits of said 16 bit data stream and generates as output 12 Z-bits comprised of four groups of three Z-bits; and wherein said four pairs of output Z-bits of said bit converter represents a sequence of four 2D subsets of 2D points from said 20 point 2D constellation for defining an 8D subtype contained within an 8D subset, and said four groups of three Z-bits generated by said block decoder define 2D points within said 2D subsets of said 20 point 2D signal constellation for defining an 8D point within said 8D subtype of an 8D subset.

11. The modem of claim 10 and further including a quadrature amplitude modulator for modulating said 8D point of said 8D subtype for transmission over a transmission media to a receiver.

12. The modem of claim 18 wherein said differential encoder causes the relative position of points in said four 2D subsets of said 20 point 2D signal constellation to be unaffected by a 90 degrees phase rotation.

13. A method for encoding data from a 16 bit data stream to generate a 20 point 2D signal constellation comprised of four 2D subsets of 2D points for constructing an 8D signal constellation from a sequence of 2D points selected from said 20 point signal constellation, said method comprising the steps of:

applying to a convolutional encoder the first three bits of said 16 bit data stream for generating one check bit;

applying the sixth and seventh bits of said data stream to a differential encoder for generating two new output bits;

applying the first five bits of said data stream; said check bit, and said output bits from said differential encoder to a bit converter for generating as output 8 Z-bits comprised of four pairs of Z-bits;

applying the remaining nine bits of said data stream to a block encoder for generating as output 12 Z-bits comprised of four groups of 3 Z-bits; and wherein said four pairs of output Z-bits of said bit converter represents a sequence of four 2D subsets of said 20 point constellation for defining an 8D subtype contained within an 8D subset, and said four groups of 3-bits generated by said block decoder define 2D points within said 2D subsets of said 20 point signal constellation for defining an 8D point within said 8D subtype of an 8D subset.

* * * * *